United States Patent Office 3,274,127
Patented Sept. 20, 1966

3,274,127
PYROLYSIS OF A 1,4-DIMETHYL BENZENE NUCLEARLY-SUBSTITUTED WITH AT LEAST ONE GASEOUS HALOGEN ATOM
Michael Mojzesz Szwarc, Syracuse, N.Y., assignor to Pullman, Incorporated, Chicago, Ill., a corporation of Delaware
No Drawing. Filed July 18, 1962, Ser. No. 210,859
7 Claims. (Cl. 260—2)

This application is a continuation-in-part of my copending application Ser. No. 306,940, filed August 28, 1952, now United States Patent 3,178,374, and my copending application Ser. No. 381,469, filed September 21, 1953, now abandoned.

This invention relates to manufacture of polymers; and it comprises a process of making solid polymers, which are nuclear substituted with methyl groups and/or organic solvents and which have great thermal stability, by pyrolyzing certain 1,4-dimethyl aryl compounds, such as para-dymethyl benzene, 1,4-dimethyl naphthalene, the halogen and methyl substituents of these compounds, which are nuclear substituted with methyl groups and/or with the atoms of normally gaseous halogen atoms, by heating the vapors of such a compound to a temperature above 700° C. but below temperatures at which excessive decomposition occurs, at a partial pressure not substantially exceeding 150 mm. Hg absolute and a total pressure not substantially exceeding 400 mm. Hg absolute, for a time not substantially exceeding 1 second, followed by cooling the resulting vapors to a temperature at which a solid polymer is deposited. The invention also includes the novel solid polymers produced by the described process, said polymers consisting substantially of a plurality of recurring units having the general formula

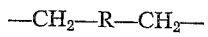

—CH₂—R—CH₂— wherein R represents an aryl nucleus, in which the methylene groups are in 1,4-positions, selected from the class consisting of benzene and naphthalene nuclei which may be substituted in the nucleus with at least one substituent selected from the class consisting of the atoms of the normally gaseous halogens and methyl groups; all as more fully set forth and as claimed.

In these prior applications I have described and claimed method of pyrolyzing (1) para-xylenes and 1,4-dimethyl naphthalene, (2) halogen-substituted para-xylenes, and (3) methyl-substituted para-xylenes and 1,4-dimethyl naphthalenes, respectively, as well as the polymers resulting from these treatments. In the present application the subject matter of these copending applications are consolidated and correlated.

The invention comprises a process for the production of a solid polymer in which the vapor of an aryl compound; of the type whose molecules contain a ring structure selected from the group consisting of the benzene nucleus and the naphthalene nucleus having at least two methyl groups in the 1,4-positions of at least one ring and with all non-nuclear bonds of the nuclear carbon atoms being bonded solely to members of the group consisting of hydrogen, methyl groups and the atoms of normally gaseous halogens; is pyrolyzed at a partial pressure preferably not higher than about 150 mm. Hg absolute and at a total pressure preferably not higher than about 400 mm. Hg absolute, by heating to a temperature between about 700° C. and about 1,000° C. for not more than from about 1 to 0.01 second, and the resulting vapors are cooled to a temperature at which a solid polymer is deposited. The invention also includes the polymers produced by the described process.

The polymers produced by the invention have many properties in that they have good electrical insulating properties, relatively high thermal stabilities, do not dissolve in the usual organic solvents at normal temperatures and are generally resistant to concentrated mineral acids at normal temperatures. Thus, they may be used wherever these properties are required, as in protective coatings and in electrical element insulation.

The starting materials which may be used for the production of the polymers of this invention have in common a fundamental aryl structure which includes a benzene nucleus or a naphthalene nucleus with two methyl groups in para or 1,4-position to each other. The simplest compound of this type is para-xylene. These starting compounds can be defined as para-dimethyl aryl compounds selected from the class consisting of para-dimethyl benzene, para-dimethyl naphthalene, the halogen-substituted compounds of para-dimethyl benzene and para-dimethyl naphthalene containing at least one nuclear-substituted atom of a normally gaseous halogen, and the methyl-substituted compounds of para-dimethyl benzene and para-dimethyl naphthalene containing at least one additional nuclear-substituted methyl group. In the case of naphthalene compounds the total number of nuclear-substituted halogen and/or methyl atoms may exceed 4. The compounds which are pyrolyzed in my process can also be defined as para-dimethyl compounds having a general formula selected from a class consisting of

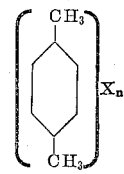

and

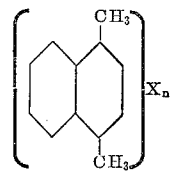

wherein X is a nuclear substituent selected from the class consisting of methyl groups and atoms of normally gaseous halogens, while $n$ usually lies between 1 and 4. My experiments indicate that the aryl compounds falling within these definitions are operative in my process. Among the specific hydrocarbons falling within the above definitions there may be mentioned, in addition to para-xylene, pseudocumene, durene, isodurene, prehnitene, pentamethyl-benzenes, hexamethylbenzene, 1,4-dimethyl naphthalene, 1,2,4-trimethyl naphthalene, 1,4,5- and 1,4,6-trimethyl naphthalenes, 1,2,3,4- and 1,3,4,5-tetramethyl naphthalenes, 1,2,4,5,8- and 1,3,4,5,7-pentamethyl naphthalenes and 1,2,3,4,6,7-hexamethyl naphthalene. These compounds are operative in my process.

The halogen substituents are limited to the normally gaseous halogens, namely chlorine and fluorine. These substituents, in the case of naphthalene compounds may be on the same ring as the methyl groups or on the other ring or on both rings. Where more than one halogen atom is present, they may be either the same halogen or different halogens. Among the specific halogen substituted compounds which are operative 2-chloro-p-xylene, 2-fluoro-p-xylene, 2,5-dichloro-p-xylene, 2,5-difluoro-p-xylene, 2,3,5-trichloro-p-xylene, 2,3,5-trifluoro-p-xylene, 2,3,5,6-tetrachloro-p-xylene, 2,3,5,6-tetrafluorop-xylene, 2-chloro-5-fluoro-p-xylene and 2-chloro-1,4-dimethyl naphthalene. These compounds are operative in my process.

Starting materials containing nuclearly substituted fluorine atoms may be prepared by introducing the fluorine atoms into the aromatic nucleus, one at a time, by the method of Balz and Schiemann, described in "Organic Reactions," volume 5, chapter 4, pages 194–216. The method comprises the reaction of the corresponding amino compound with nitrous acid and fluoroboric acid and the decomposition of the resulting fluoroborate to produce the desired aromatic fluoride, free nitrogen and boron trifluoride.

Similarly, starting materials containing nuclearly substituted chlorine atoms may be prepared by introducing the chlorine atoms into the aromatic nucleus, one at a time, by the well known Sandmeyer Reaction, as described in "Organic Synthesis," collective volume I, page 170. The method comprises the reaction of the corresponding amino compound with nitrous acid and hydrochloric diazonium salt in the presence of cuprous chloride to produce the desired aromatic chloride and free nitrogen. Amino groups may be introduced into the aromatic nucleus by well known methods, as by nitration of the aromatic compound with fuming nitric acid, followed by the reduction of the nitro compound produced by tin and hydrochloric acid.

Chlorine atoms may also be introduced into the aromatic nucleus by the reaction of the aromatic compound with elemental chlorine in the absence of light and in the presence of a Friedel-Crafts type catalyst, such as ferric chloride. If desired, chlorine atoms may be introduced into a nucleus already containing fluorine atoms, or vice versa.

The contact times most suitable for use in the pyrolysis step of the process of the invention depend largely on temperatures at which the pyrolysis is carried out. It has been found that the higher the temperature, the shorter is the contact time required to obtain optimum conversions and to reduce the loss of starting material not converted to the solid polymer.

My tests indicate that the operative temperature range is from about 700° C. up to temperatures at which excessive decomposition or excessive carbonization occurs with the contact time employed. With a given equipment it is usually found that there is a minimum contact time which practically cannot be shortened and for each such contact time there is an upper temperature limit beyond which the 1,4-dimethyl compounds break down or decompose beyond the stage at which two hydrogen atoms are split off, i.e. at which the monomers themselves decompose. At substantially this same point excessive decomposition is indicated by excessive carbonization, i.e., by increase in the deposition of carbon in the apparatus. A decrease of yield may also be an indication of excessive decomposition or carbonization. It should be mentioned, of course, that the deposition of carbon represents no particular problem in my process since very little carbon is deposited under normal conditions of operation but the deposition of carbon serves as a rough test for the amount of decomposition occurring. A satisfactory temperature range for my process is from about 700° C., to about 1000° C. Somewhat better results are obtained over the narrower range of from 800° C. to about 1000° C. and still better results within the range of from 850° C. to about 1000° C. For best results the contact time should be less than 1 second even at 700° C. while at about 1000° C. it should be of the order of 0.1 to 0.01 second. Thus the temperature range of from 800° C. to about 1000° C. corresponds to an optimal heating time of from about 1 to 0.1–0.01 second, while the range of 850° C. to about 1000° C. corresponds to an optimal heating time of from about 0.5 to 0.01 second.

For the purpose of convenience, it is assumed that the residence time of the vapors in a pyrolysis tube is equivalent to the contact time at pyrolysis temperature. This approximation is most accurate when the aromatic vapor is preheated close to pyrolysis temperatures before introduction into a pyrolysis tube and is most accurate when heating efficiency of the pyrolysis tube is high. In any case, however, the term "contact time" as used herein is the total time in the pyrolysis tube and is obtained by dividing the length of the tube by the linear velocity of the vapors.

To avoid excessive cracking it is necessary that the pyrolysis be conducted at sub-atmospheric pressures. For best results the aromatic vapor should be present at partial pressures not substantially higher than 150 mm. Hg absolute. Excellent results are obtained when the partial pressure of the aromatic compound is 8 to 10 mm. or somewhat below. The pyrolysis can be conducted advantageously in the presence of an inert gas. Carbon dioxide or nitrogen can be used, particularly when the partial pressure of the aromatic compound is 10 mm. Hg or below. Other operative gases are combustion flue gases and, of course, the so-called fixed or rare gases, such as helium, argon, etc., also hydrogen can be used at low partial pressures and hydrocarbons which do not crack at the temperatures of the process used at sufficiently low partial pressures as not to affect the formation of the polymers. When inert gases are employed it is advantageous to employ those which can be used in predominating proportions as compared with the 1,4-dimethyl compound or compounds. Practically gases selected from the class consisting of carbon dioxide, nitrogen and flue gases would be the ones normally used. In all cases the total pressure employed should be below 400 mm. Hg absolute.

The polymers or polymeric products of the invention are formed spontaneously on cooling the pyrolyzed vapor. The temperature to which the vapor is cooled for condensation and polymerization affects the characteristics of the polymer. The optimum cooling temperature can easily be determined by experiment. It depends on the partial pressure of the monomer vapor in the gas phase and increases with increasing partial vapor pressure. Cooling to from 0° to 50° C., and preferably to room temperature, will, however, be generally found most satisfactory for this purpose in the processes of the invention, though on occasion it may be found advantageous to cool down to −80° C.

The polymers may be recovered in film form by cooling in contact with a cold surface and may be washed with benzene, ether or other suitable solvent to remove uncondensed starting material and other soluble material present. After formation the films can readily be stripped from the surface on which they have been deposited to form coherent self-supporting elastic films.

Physical and chemical analyses of my polymers prove that they are composed of molecules composed of connected recurring units having the general formula —$CH_2$—R—$CH_2$—, wherein R represents a nucleus selected from the class consisting of benzene and naphthalene nuclei which may be substituted with at least one substituent selected from the class consisting of the atoms of the normally gaseous halogens and methyl groups and in which the two methylene groups are in the 1,4-positions. The polymer chains have end groups which are usually hydrogen atoms produced by dehydrogenation of the starting material and occasionally methyl groups produced by a demethylation side reaction, as in the formation of by-product toluene. However, end groups in a large polymer molecule ordinarily affect the characteristics of the polymer very little, and are, therefore difficult to determine. In some cases, incidental impurities present in the reaction zone may act as "chain stoppers" and form the end groups of the polymer structure. My tests indicate that many of my polymers comprise at least about 100 recurring units; hence a more specific general formula for these polymers would be $$(-CH_2-R-CH_2-)_n$$

wherein $n$ is an integer equal to at least 100.

Upon chemical analysis empirical formulas for my polymers can be obtained and these confirm the structures given above. For example, the analysis of the polymer obtained from para-xylene corresponds to the ratio C:H=1:1, agreeing with $(C_8H_6)_x$, and the polymer from 2-fluoro-p-xylene corresponds to the ratio $$C:H:F = 8:7:1,$$

conforming with the formula $(C_8H_7F)_x$, wherein $x$ may be any integer. These ratios are, of course, over all ratios between the atoms present in the polymers.

It has been found that the polymer from para-xylene may be oxidized in strong chromic acid solution to produce terephthalic acid. The most likely mechanism for this would be in the trupture of the polymer between the $CH_2$ groups and the oxidation of these to carboxylic groups.

Infra red investigation of the polymer produced from para-xylene shows only $CH_2$ groups and aromatic C—H bonds. Infra red investigation of the halogenated polymer shows, in addition, C—X bonds, X representing halogen. This is consistent with the polymer structure assumed above.

Experiments carried out by reacting the pyrolyzed vapors of para-zylene with iodine vapors have results in the production of para-xylene diiodide $$(CH_2I \cdot C_6H_4 \cdot CH_2I)$$

a known compound. The reaction of the pyrolyzed vapors of 2-fluoro-p-xylene with iodine vapor have resulted in the deposition of a compound in the form of white needles having a melting point of 150–151° C. The results obtained on analysis of the compound indicate that it is 2-fluoro-p-xylylene diiodide. These experiments prove that 1,4-dimethylene benzene and 2-fluoro-1,4-dimethylene benzene exist in the vapor phase when para-xylene and 2-fluoro-p-xylene are pyrolyzed. Similarly, it may be shown that 1,4-dimethyl-naphthalene produces 1,4-dimethylene naphthalene, pseudocumene produces 1,4-dimethylene-2-methyl benzene, durene produces 1,4-dimethylene-2,5-dimethyl benzene and isodurene produces 2,5-dimethylene-1,3-dimethyl benzene. A detailed description of the formation and analysis of iodo compounds of this type may be found in my article in the Journal of Polymer Science, volume VI, No. 3, March, 1931, pages 321–324. It may be noted that this article contains one incorrect statement, namely that pseudocumene does not form polymers on pyrolysis.

X-ray examinations carried out on the polymers of this inveniton have shown them to have a crystalline structure.

In most cases, as pointed out previously, my polymers consist of at least 100 monomeric units and have the desirable characteristics associated with high molecular weight polymers. They are relatively high in softening point, all of them softening at temperatures well above 200° C., and the polymer from para-xylene softening at nearly 400° C. All of the polymers of this invention are insoluble at ordinary temperatures in low boiling organic solvents. However, my polymers are soluble at elevated temperatures in high boiling aromatic solvents such as diphenyl, benzyl benzoate, phenanthrene and polycyclic aromatic fractions obtained from the distillation of coal tar products and petroleum cracking. Thus the polymer from para-xylene is soluble in such solvents at temperatures in the region of 250° to 300° C. and above, and those from chloro-para-xylene and pseudocumene in the region of 180° to 200° C. and above.

My polymers prepared in accordance with the method described above may be recovered in substantial yields, particularly when conditions are optimum for good yields. The optimum conditions are those which provide a practical level of conversion, while at the same time minimizing side reactions which produce undesirable by-products.

By-products are often produced by longer pyrolysis times and higher partial pressures, which are conducive to excessive cracking. Pyrolysis times longer than one second and partial pressures higher than 200 mm. Hg absolute result in so much side reaction that only negligible yields of polymer may be obtained.

Total pressures in excess of about 400 mm. Hg absolute also result in lowered yields. In fact, dilution with an inert diluent gas often makes it necessary to operate at even lower partial pressures of para-xylene in order to obtain comparable yields. Thus, while total pressures up to 400 mm. Hg absolute may be used, it is even more preferable in the presence of large proportions of diluents, that the monomer vapor pressure be in the region of 10 mm. Hg absolute pressure or below.

When conversion is carried out under good operating conditions, including partial pressures below 10 mm. Hg absolute, and pyrolysis time below about 0.5 second, 100 parts by weight of para-xylene introduced into the reactor produce a mixture of which 15 parts are the desired polymer, 25 parts are by-products and 60 parts are recovered as unreacted para-xylene. The by-products contain toluene, gases and low polymers, primarily dimers.

My invention can be described in greater detail by reference to the following specific examples which represent practical embodiments of my process. All pressures mentioned are absolute pressures.

*Example 1* p-Xylene vapor at a pressure of 8 to 10 mm. Hg was passed through a tube heated to 860° C. at such a rate that the vapor was subjected to this temperature for from 0.3 to 0.4 second. The vapors leaving the tube were passed into a trap in which they were cooled to 0° C. in contact with a cold surface on which the polymerized product was deposited in the form of a white, occasionally transparent, film.

The yield of polymer was approximately 12% by weight of the p-xylene treated. Unconverted p-xylene was also condensed in a following trap in which the vapors were cooled to −80° C.

*Example 2*

Carbon dioxide at atmospheric pressure was bubbled through liquid p-xylene maintained at 100° C. to take up p-xylene vapor so that the partial pressure of the latter in the mixture was about 100 mm. Hg. The mixture of carbon dioxide and vapor was then passed at a total pressure of about 300 mm. Hg through a tube heated to 800° C. at such a rate that it was subjected to this temperature for one second. The gaseous mixture leaving the tube was cooled to room temperature in a trap in which the polymer was deposited in the form of a white, occasionally transparent, film. The yield was less than 1%.

*Example 3* p-Xylene vapor at a pressure of 1.5 mm. Hg was passed through a silica tube heated to 920° C. at such a rate that the vapor was subjected to this temperature for about 0.1 second. The vapors leaving the tube were cooled to room temperature and the polymerized product was deposited.

The polymer was in the form of a film similar to that obtained in Example 1, and was recovered in a yield of about 14%.

*Example 4*

1,4-dimethyl naphthalene vapor at a pressure of about 10 mm. Hg was passed through a tube heated to 860° C. at such a rate that the vapor was subjected to this temperature for from 0.3 to 0.4 second. The vapors leaving the tube were passed through a trap in which they were cooled to room temperature. The polymerized product was deposited in the trap in the form of a white film.

*Example 5*

2-fluoro-p-xylene vapor at a pressure of 8 to 10 mm. Hg was passed through a tube heated to about 800° C. at such a rate that the vapor was subjected to this temperature for from 0.3 to 0.4 second. The vapors leaving the tube were passed into a trap in which they were cooled to 0° C. in contact with a cold surface on which the polymerized product was deposited in the form of a white, occasionally transparent, film.

The yield of polymer was approximately 10% by weight of the 2-fluoro-p-xylene treated. Unconverted 2-fluoro-p-xylene was condensed in another trap cooled to −80° C.

*Example 6*

2-chloro-p-xylene vapor at a pressure of about 10 mm. Hg was passed through a tube heated to about 800° C. at such a rate that the vapor was subjected to this temperature for about 0.4 second. The vapors leaving the tube were cooled to room temperature and the polymerized product was deposited.

The polymer was in the form of a film similar to that obtained in Example 5.

*Example 7*

2,5-dichloro-p-xylene vapor at a pressure of about 10 mm. Hg was passed through a tube heated to about 800° C. at such a rate that the vapor was subjected to this temperature for about 0.4 second. The vapors leaving the tube were cooled to about 50° C. and the polymerized product was deposited.

The polymer was in the form of a film similar to that obtained in Example 5.

*Example 8*

Pseudocumene vapor at a pressure of 2 mm. Hg was passed through a silica tube heated to 850° C. at such a rate that the vapor was subjected to this temperature for 0.12 second. The vapor leaving the tube was passed into a trap in which it was cooled to approximately 18° C. in contact with a cold surface on which a polymeric product was deposited in the form of a yellowish coherent film. Pseudocumene was also condensed in the trap. The yellow film was washed with ether to remove any condensed soluble material.

*Example 9*

Pseudocumene vapor at a pressure 2 mm. Hg was passed through a silica tube heated to 900° C. at such a rate that the vapor was subjected to this temperature for 0.04 second. The vapor leaving the tube was cooled as in Example 8 to approximately 18° C. A polymeric product in the form of a yellowish film was obtained, which was washed with ether to remove any condensed soluble material.

The polymeric products obtained in Examples 8 and 9 were flexible and on molding at a temperature of about 300° C. and under moderate pressure yielded a tough, flexible product. This product had good electrical insulating properties and was capable of withstanding temperatures up to at least 200° C.

*Example 10*

Durene vapor at a pressure of 2 mm. Hg was passed through a silica tube heated to 845° C. at such a rate that the vapor was subjected to this temperature for 0.21 second. The vapor leaving the tube was cooled as in Example 8, to yield a polymeric product which was washed with benzene to remove any condensed soluble material. The polymeric product was recovered as an opaque, white film, which was tough and flexible.

The polymeric product was satisfactorily molded at about 320° C. and under pressure. The molding was, however, more brittle than those obtained from the products of Examples 8 and 9.

*Example 11*

Example 10 was repeated with isodurene under the same temperature and pressure conditions but with a contact time for the pyrolysis of 0.05 second. The resultant polymer was satisfactorily molded at about 300° C. and under pressure to yield a very flexible product.

*Example 12*

The vapors of a mixture of o- and p-xylene containing 55 percent by weight of the latter was passed through a silica tube heated to 900° C. The contact time was 0.17 second and the pressure was 4.5 mm. Hg. The vapor leaving the tube was cooled to room temperature and the film which was deposited was washed with benzene. The product has a similar appearance and properties to that obtained in Example 1, but was obtained in a smaller yield. The o-xylene present evidently acted as an inert diluent in this example.

It has been found that when a mixture of o-, m- and p-xylenes is employed the p-xylene must be present in proportions of at least about 50% by weight to produce appreciable yields of my polymer.

*Example 13*

Para-xylene vapor at a pressure of 150 mm. Hg was passed through a tube heated to 820° C. at such a rate that the vapor was subjected to this temperature for about 0.1 second. The vapors leaving the tube were cooled to room temperature and the polymerized product was deposited.

The polymer was in the form of a deposit on the wall. The yield was poor.

*Example 14*

Hexamethyl benzene was vaporized and the vapors pyrolyzed by passing them through a tube heated to a temperature of 825° C. at such a rate that the time of contact was 0.05 second. A small amount of insoluble polymer was recovered in this operation.

As may be noted from the above examples, and particularly by comparison of Example 13 with Example 1, the yield of polymer is reduced as the partial pressure approaches about 150 mm. Hg absolute.

While all of the polymers produced from the various starting materials have the generally desirable properties enumerated previously, there is a variation in the properties of the product produced by the process of the invention from different starting materials.

Thus, whereas the polymeric products from p-xylene, 1,4-dimethyl naphthalene and durene will only dissolve at temperatures above 250° C. in aromatic solvents boiling above this temperature, the products from pseudocumene, isodurene and 2-chloro-p-xylene will dissolve at temperatures of about 200° C. in aromatic solvents boiling above 200° C.

All of these products will resist attack by cold concentrated hydrochloric, nitric or sulfuric acid and by hot concentrated hydrochloric acid. However, the products from pseudocumene, durene and isodurene are attacked by hot concentrated nitric and sulfuric acids. Those from p-xylene and 1,4-dimethyl naphthalene are attacked only slowly by hot concentrated sulfuric acid.

The softening points of the various products also vary. Thus, the products from p-xylene, 1,4-dimethyl naphthalene and durene do not soften to any noticeable extent below 300° C. The pseudocumene product does not soften below 250° C. but softens at about 280° C. and the isodurene product does not soften below 200° C. but softens at about 240° C.

The products from pseudocumene and isodurene can be molded at a temperature of 300 to 320° C. under a pressure of ½ ton/sq. inch to give flexible products.

The products from durene and 2-chloro-p-xylene can also be molded to give a tough, inflexible product but the product from p-xylene is difficult to mold and yields a brittle product. The p-xylene polymer may, however, be suitably used in comminuted form as filler for compositions in which its properties are valuable and may also be directly deposited as a coating in film form.

While I have described what I consider to be the most advantageous embodiments of my process it is evident that various modifications can be made in the specific procedures which have been described without departing from the purview of this invention. Thus, while I have described the polymer as being recovered by precipitating it on a cold surface in the form of a film, various other ways of recovering the polymer can be used. For example, it can be recovered in finely divided form by chilling the pyrolyzed vapors with a spray of non-solvent, such as ethylene glycol, for example. In this form the powdered material recovered can be used as a molding powder. While a tubular reaction zone is convenient in the pyrolyzing step of my invention, any type of equipment can be employed which is capable of quickly heating the aryl hydrocarbon vapors to temperatures above about 700° C. to 850° C. and maintaining them at that temperature for a small fraction of a second. Flash heating followed by flash cooling is required for best yields. Further modifications of this invention which fall within the scope of the following claims will be immediately evident to those skilled in this art.

I claim:

1. In the manufacture of solid polymers which have high heat stability, high resistance to acids and high resistance to organic solvents, the process which comprises pyrolyzing a halogenated 1,4-dimethyl benzene which is nuclear-substituted with at least one atom of a gaseous halogen selected from the group consisting of fluorine and chlorine; by heating the vapors of such a compound to a temperature above 700° C. but below those at which excessive decomposition occurs, at a partial pressure not substantially exceeding 150 mm. Hg absolute and a total pressure not substantially exceeding 400 mm. Hg absolute, for a time not substantially exceeding 1 second, followed by cooling the resulting vapors to a temperature at which a solid polymer is formed.

2. In the manufacture of solid polymers which have high heat stability, high resistance to acids and high resistance to organic solvents, the process which comprises pyrolyzing a para-xylene which is substituted in the nucleus with at least one atom of a gaseous halogen selected from the group consisting of fluorine and chlorine, by heating the vapors of such a compound to a temperature above 700° C. but below those at which excessive decomposition occurs, for a time not substantially exceeding 1 second and at a pressure not substantially exceeding atmospheric pressure, followed by cooling the resulting vapors to a temperature at which a solid polymer is formed.

3. The process of claim 2 wherein the para-xylene compound is 2,5-dichloro-p-xylene.

4. The process of claim 2 wherein the para-xylene compound is 2-chloro-p-xylene.

5. The process of claim 2 wherein the para-xylene compound is 2-fluoro-p-xylene.

6. The process of claim 2 wherein the pyrolysis is conducted at temperatures within the range of from about 700° to 1000° C.

7. The process of claim 2 wherein the pyrolysis is conducted with the vapor of the para-xylene diluted with an inert gas selected from the class consisting of carbon dioxide and nitrogen.

References Cited by the Examiner
UNITED STATES PATENTS 2,186,366   1/1940   Coleman et al. _____ 260—2

OTHER REFERENCES

McGraw-Hill Encyclopedia of Science and Technology (McGraw-Hill Book Company Inc.), 1960, volume 5, page 536.

Encyclopedia of Chemical Technology (The Interscience Encyclopedia, Inc.), 1951, volume 6, page 885.

Elementary Practical Organic Chemistry, Arthur I. Vogel (Longmans, Green and Co.) (1957), Part I, pages 218–219.

Advanced Organic Chemistry, L. Fieser and M. Fieser (Reinhold Publishing Corporation), 1961, pages 650–1.

WILLIAM H. SHORT, *Primary Examiner.*

LOUISE P. QUAST, *Examiner.*

H. D. ANDERSON, *Assistant Examiner.*

UNITED STATES PATENT OFFICE
CERTIFICATE OF CORRECTION

Patent No. 3,274,127 September 20, 1966

Michael Mojzesz Szwarc

It is hereby certified that error appears in the above numbered patent requiring correction and that the said Letters Patent should read as corrected below.

Column 1, line 18, strike out "nuclear substituted with methyl groups and/or" and insert instead -- resistant to acids, insoluble in most low-boiling --; column 5, line 20, for "trupture" read -- rupture --.

Signed and sealed this 29th day of August 1967.

(SEAL)
Attest:

ERNEST W. SWIDER
Attesting Officer

EDWARD J. BRENNER
Commissioner of Patents